United States Patent [19]

Lee et al.

[11] Patent Number: 4,492,968

[45] Date of Patent: Jan. 8, 1985

[54] DYNAMIC CONTROL OF NONLINEAR INK PROPERTIES FOR DROP-ON-DEMAND INK JET OPERATION

[75] Inventors: Francis C. Lee, San Jose; Ross N. Mills, Morgan Hill; Tiefa K. Niweigha, San Jose; Frank E. Talke, Morgan Hill, all of Calif.

[73] Assignee: International Business Machines, Armonk, N.Y.

[21] Appl. No.: 431,407

[22] Filed: Sep. 30, 1982

[51] Int. Cl.³ .............................................. G01D 15/16

[52] U.S. Cl. ................................................ 346/140 R

[58] Field of Search ................................. 346/140 PD

[56] References Cited

U.S. PATENT DOCUMENTS 3,893,131 7/1975 Perel ............................ 346/140 PD
4,216,483 8/1980 Kyser ........................... 346/140 PD
4,266,232 5/1981 Juliana ............................ 346/140 R
4,300,144 11/1981 Isayama ........................ 346/140 PD
4,393,388 7/1983 Matsuda ....................... 346/140 PD
4,409,596 10/1983 Ishii ............................. 346/140 PD

*Primary Examiner*—E. A. Goldberg
*Assistant Examiner*—M. Reinhart
*Attorney, Agent, or Firm*—Otto Schmid, Jr.

[57] ABSTRACT

A drop-on-demand ink jet printing apparatus comprising a print head having an electromechanical transducer mounted in mechanical communication with the fluid in a fluid chamber within the print head. The transducer is selectively energized with a drop ejecting signal so that one drop of ink is ejected for each drop ejecting signal. In addition the transducer is energized with a series of low amplitude excitation signals which serve to maintain substantially constant dynamic ink characteristics so that quality printing is produced especially during start-up of the apparatus. The excitation pulses can be asynchronous with respect to the drop ejecting signals or synchronous but delayed with respect to the drop ejecting signals. Isolation means are provided to prevent concurrent excitation of the transducer with both a drop ejecting signal and an excitation signal.

9 Claims, 9 Drawing Figures

VOLTAGE DRIVE PULSE

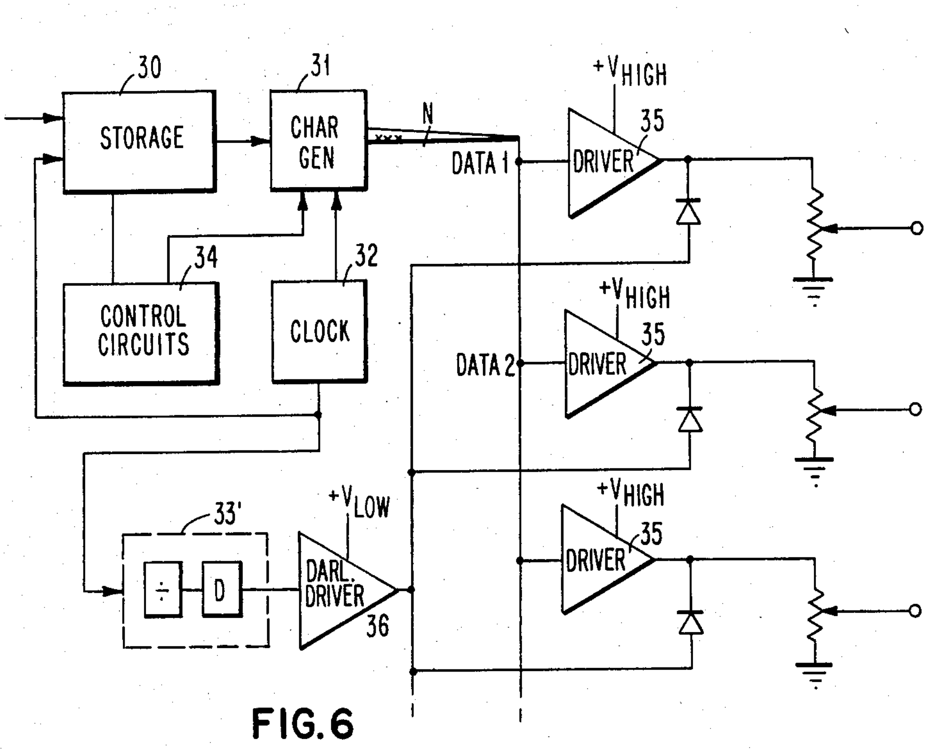
FIG.6
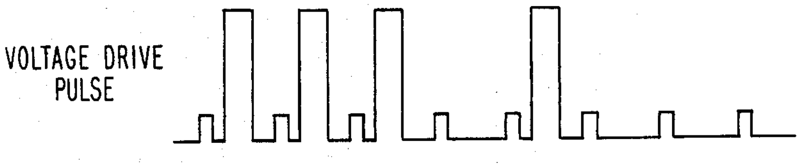
FIG.7
ORDER LIST
FIG.8
ORDER LIST
FIG.9

DYNAMIC CONTROL OF NONLINEAR INK PROPERTIES FOR DROP-ON-DEMAND INK JET OPERATION

BACKGROUND OF THE INVENTION

1. Field of the Invention

This invention relates to an improved ink jet printing apparatus and method for generating ink drops on demand under control of suitable electrical signals.

2. Description of the Prior Art

There have been known in the prior art ink jet printing systems in which a transducer is selectively energized to produce ink drops on demand. The prior art drop-on-demand printing systems have been generally limited by a low drop production rate, low resolution and low efficiency.

Commonly assigned U.S. Pat. No. 4,266,232 discloses apparatus for drop-on-demand ink jet printing in which the transducer is driven with voltage control pulses at a selectively controlled amplitude at a synchronous rate. This apparatus produced ink drops of equal size and spacing at an improved print rate and with improved print quality.

Copending application Ser. No. 274,989, filed June 6, 1981, by Lee et al entitled "Drop-On-Demand Method and Apparatus Using Converging Nozzles and High Viscosity Fluids" discloses a further improved system which is capable of operating with high viscosity ink to produce high resolution printing at still higher drop rates. However, under some operating conditions, the system failed to properly start after a period of rest or idling. In these cases, the first few drops after idle time (during which no drops were ejected) were either not ejected at all or were ejected with diminished velocity and/or uncontrolled direction so that the first few characters after idling exhibit missing or misplaced drops.

SUMMARY OF THE INVENTION

It is therefore the principal object of this invention to provide an improved drop-on-demand printing system which produces high resolution printing under all operating conditions.

Briefly, according to the invention, there is provided a drop-on-demand ink jet printing method and apparatus comprising a print head having a fluid chamber supplied with a suitable marking fluid. An electromechanical transducer is mounted in mechanical communication with the fluid chamber. The transducer is energized with a series of data signals so that one drop of the marking fluid is ejected for each of the signals having at least a predetermined amplitude. In addition to the drop ejecting signals, a series of excitation signals having a predetermined frequency and an amplitude small with respect to the drop ejecting signals is coupled to energize the transducer so that pressure waves are generated and propagated in the marking fluid within the fluid chamber to maintain the marking fluid characteristics constant and thereby prevent misplaced or missing ink drops after an idle period.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 6 is a block diagram of an alternate embodiment of the control means for controlling the printer;

FIG. 7 is a diagram showing the voltage drive pulses for drop-on-demand operation in accordance with the embodiment of FIG. 6.

FIG. 8 is an image of a centered heading on a document printed by a drop-on-demand ink jet printer;

FIG. 9 is an image of the centered heading shown in FIG. 8 printed by the same drop-on-demand ink jet printer modified to embody the present invention.

DESCRIPTION OF THE PREFERRED EMBODIMENTS

Figure 1:
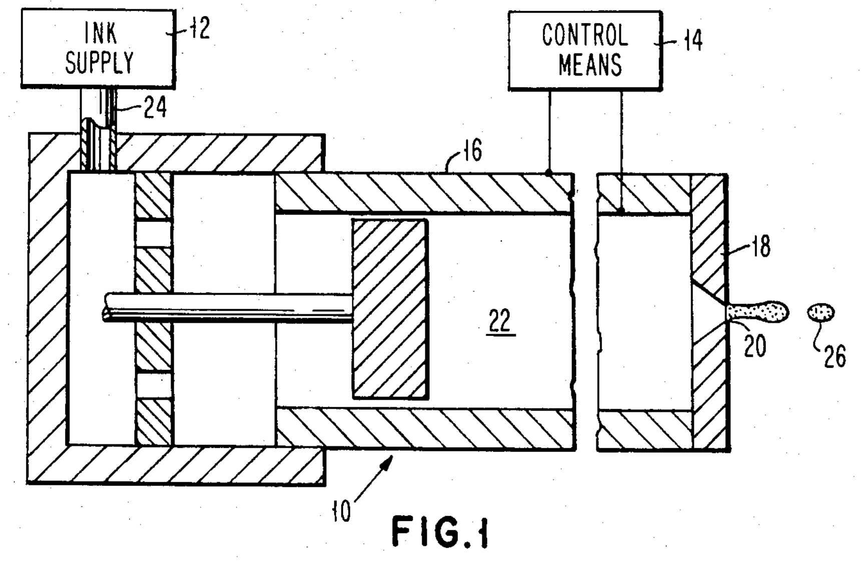
FIG. 1 is a schematic view of a drop-on-demand ink jet printer having a single nozzle.

Referring to FIG. 1, the printer apparatus comprises a print head 10 to which is supplied liquid ink from ink supply means 12. The viscosity for inks for high resolution printing extends up to 100 centipoise, and the viscosity can be substantially higher for applications in which lower resolution is suitable. Control means 14 provides the voltage control pulses to selectively energize print head 10 to produce one ink drop for each voltage pulse supplied to print head 10. Print head 10 comprises a hollow cylindrical transducer member 16 closed at one end by a nozzle plate 18 to form a chamber or cavity 22 therein. Cavity 22 is maintained filled with ink through supply line 24 from ink supply means 12. Ink from supply means 12 is not pressurized so the ink in cavity 22 is maintained at or near atmospheric pressure under static conditions. An exit from cavity 22 is provided by nozzle portion 20 which is designed so that the ink does not flow out of, or air flow into, nozzle portion 20 under static conditions. Transducer 16 displaces radially when energized with a suitable voltage pulse, and produces a pressure wave in cavity 22 so that liquid ink is expelled out through nozzle portion 20 to form a single drop 26. Control means 14 provides the voltage control pulses 60 (see FIG. 5) to selectively energize transducer 16 to produce one ink drop 26 for each suitable voltage pulse applied to transducer 16.

Figure 2:
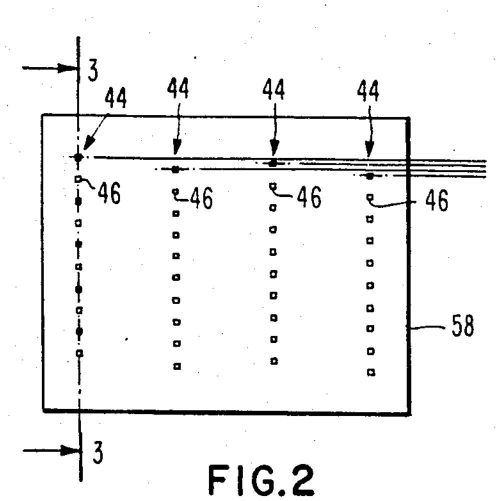
FIG. 2 is a right side view of an array of drop-on-demand ink jet print heads.
Figure 3:
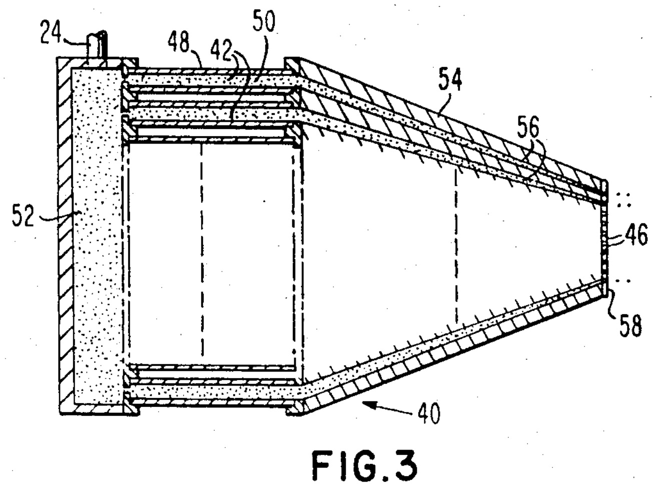
FIG. 3 is a section view taken along lines 3—3 in FIG. 2.

FIGS. 2 and 3 show a print head array 40 comprising forty print heads 42 arranged in four rows 44 with corresponding orifices 46 offset so that a line of printing can be produced at a resolution approaching engraved type as the print head moves across a print sheet. Each of the print heads 42 comprises a hollow cylindrical piezoelectric transducer 48 which forms an ink chamber 50 to which ink is supplied from common reservoir 52. A housing 54 is provided which includes a tapered channel 56 for each print head which transmits ink from ink chamber 50 to the corresponding orifice 46 in nozzle plate 58.

During printing, print head 10 is traversed across the print medium at a constant velocity and character bit data is generated by control means 14, as will be described below in greater detail, in synchronism with the head movement so that drops can be formed at selected intervals T responsive to the character bit data to produce the desired print data on the print medium. The apparatus for providing the synchronized movement of print head 10 is known in the art, so this apparatus is not described here since detailed knowledge of that apparatus is not required for an understanding of the invention.

According to the invention, ink drops are produced with equal size and spacing by modulating the voltage drive to transducer 16 so that a selected drive voltage pulse 60 is produced at each of the drop production times T for which an ink drop is required for printing. In addition, a series of low amplitude excitation pulses 28 is produced to maintain print quality under all operating conditions within the printer design limits.

The addition of the low amplitude excitation pulses 28 to drive transducer 16 or 48 provides a solution to the "start-up" problem that has occurred under some operating conditions. The "start-up" problem appears to be more prevalent when using high viscosity ink, and the problem is manifested after a period of rest or idling (during which no drops were ejected) by missing or misplaced drops in the first few characters printed after idling. FIG. 8 shows a printed image in which the problem is apparent. As shown in FIG. 8, the enlarged (2X) image comprises a printed heading "ORDER LIST." This image was printed after a period of idling, and at least the first few characters are formed with an unacceptably low resolution as can be seen in FIG. 8. In contrast, the image shown in FIG. 9 was printed by the same printer with an equal period of idling, but with one change; the source of low amplitude excitation pulses was switched ON so that the printer was operating in accordance with our invention. By reference to FIG. 9 it can be seen that this enlarged image is of resolution approaching that of engraved type.

It has been found that high viscosity ink is essential for stable and reliable drop-on-demand ink jet operation as is described in the above-identified Lee et al application. A specific ink formulation utilizes thickeners to control ink viscosity, and this ink formulation results in excellent print quality, has short drying time on paper and is compatible with the print head materials. The "start-up" problem was found to be due to non-linear behavior of ink viscosity and surface tension due to the thickeners in the solution. These thickeners include some polymers, and it is known that the molecular structure of a compound liquid close to the air-liquid interface can be changed under dynamic conditions. There exists a dynamic surface tension different from the static surface tension given in standard surface tension measurements. In addition, the viscosity of the solutions depends highly on the dynamic state of the fluid system (e.g., the strain rate). During normal drop-on-demand printing where drops are ejected frequently, the fluid in the nozzle is in a quasi-steady (dynamic) state and the effective viscosity and surface tension are relatively constant. However, during idle periods of a few second, the meniscus and internal fluid oscillation are damped out and the effective viscosity and surface tension return to their static values which are significantly different from their dynamic values. This change in the fluid properties appears to be the cause of the start-up problem. The problem has been observed at viscosities as low as 6 or 7 centislokes in a particular ink formulation and print head design.

The solution to the problem comprises the addition of low amplitude excitation pulses 28 to drive transducer 16 or 48. In a specific embodiment similar to the array shown in FIGS. 2 and 3, the low amplitude pulses had frequencies within the range from 100 Hz to 10 KHz, pulse widths from 10 μs to 30 μs and pulse amplitudes from 3 volts to 7 volts. These results show a relative insensitivity to pulse frequency and pulse width. This is believed to be due to the fact that oscillation within the ink in the ink chamber (regardless of whether or not drops are ejected from the nozzle) is governed primarily by acoustic waves travelling back and forth between the two ends of the chamber (acoustic "ringing"). The "ringing" frequency is proportional to the speed of sound C in the fluid divided by the length of the chamber L or C/L (which is usually of the order of 25 KHz or higher). When a low amplitude voltage pulse is applied to the piezoelectric transducer, it excites the acoustic ringing momentarily until viscous dissipation, coupling loss to boundaries and acoustic absorption in the fluid dampens it out. Hence periodic reactivation of the ringing is required to maintain a constant state of acoustic ringing. The frequency of the reactivation (i.e. the frequency of the low amplitude excitation pulses) is not critical as long as it is much faster than the acoustic damping time. In addition, the excitation frequency, the pulse width, and the amplitude could all vary in time, if desired. Due to the ringing a certain amount of fluid mixing occurs, and any "skin" that could form on the meniscus due to the presence of the thickener component in the ink is broken up.

Control means 14 may comprise any suitable means for accepting the print data, which is usually in coded form, generating the bit patterns to produce the print data in the desired font, and producing the drive pulses to control transducer 16 or 48 to produce the print data on the record medium. Control means 14 may comprise hard wired logic or this operation may be provided by the processor of a data processing system of which the printer is a part. In addition, control means 14 may comprise a microcomputer which provides this drive voltage control as well as other control functions for the printer. Other data sources, such as non-coded information data can also be printed.

Figure 4:
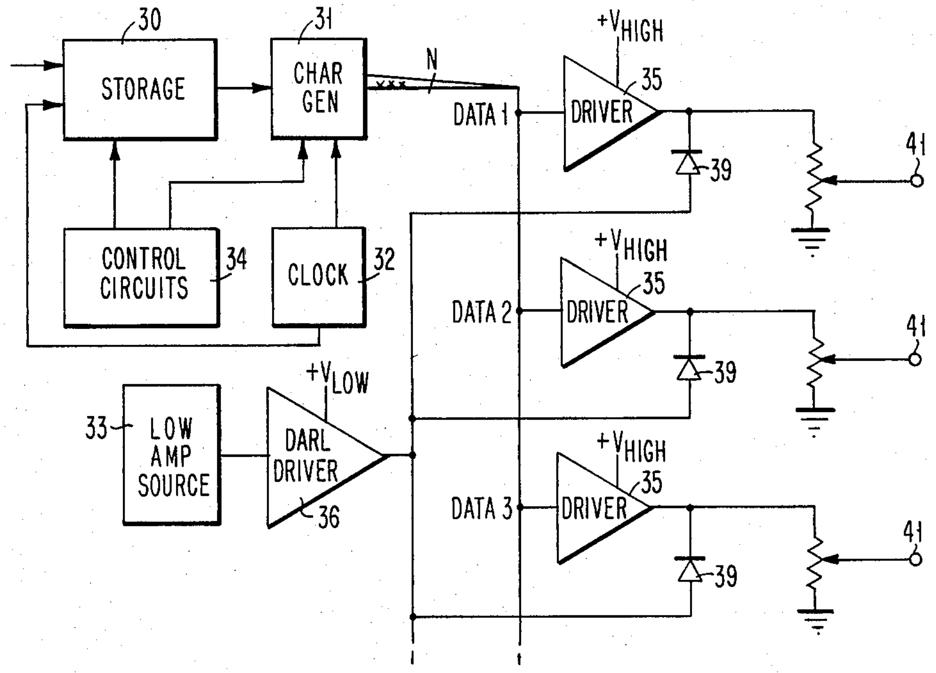
FIG. 4 is a block diagram of one embodiment of the control means for controlling the printer.
Figure 5:
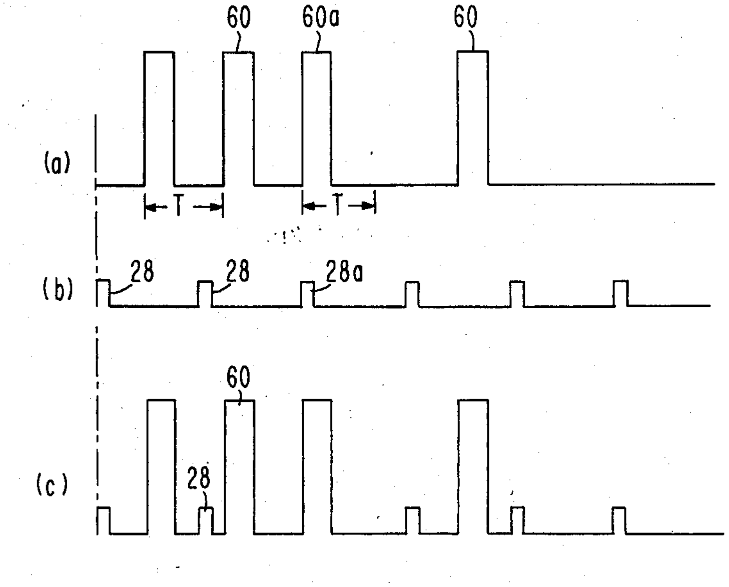
FIG. 5 is a diagram showing the voltage drive pulses for drop-on-demand operation in accordance with the present invention.

Referring to FIG. 4, the embodiment of control means 14 shown comprise a storage device 30, a character generator 31, a clock pulse generator 32, a low amplitude excitation pulse source 33, and sequencing control means 34. Storage device 30 functions to store the print data and the desired character fonts. Character generator 31 produces appropriate bit pattern data to produce the print data on the record medium. Clock pulse generator 32 produces timing pulses to define cycles for storage device 30, to define the intervals T and to synchronize other components of the printer. These clock pulses may be derived from a system clock, if desired, which is divided to produce pulses of the desired frequency. The low amplitude excitation pulse source 33 comprises a source of pulses 28 of chosen amplitude and pulse width of frequency asynchronous with respect to the drop intervals T as shown in FIG. 5 with the frequency chosen to be much faster than the acoustic damping time in print head 10. A separate clock pulse generator can be used in source 33, or, since a number of pulse sources are usually available in a printer, an existing pulse source can be used. A divider or multiplier can also be used in conjunction with an existing pulse source if required to produce pulses of the desired frequency. One suitable pulse source for use in source 33 is the pulses that are generated by an encoder (not shown) mounted on the shaft for driving the print head across the print medium.

As shown in FIG. 5, waveform a, the data pulses 60 are produced in response to signals generated by character generator 31. The data pulses 60 are selectively generated at a fixed interval T. As shown in FIG. 5 a data pulse 60 is generated for each of the first three intervals, but no pulse is generated (i.e. no drop required for printing) at the fourth interval. A data pulse 60 is generated at the fifth interval, but no data pulses are generated for any of the succeeding intervals shown in FIG. 5. The low amplitude excitation pulses 28 are shown in FIG. 5, waveform b, and these pulses are of a fixed frequency and pulse width. The frequency of these pulses is asynchronous with respect to the intervals T. Two asynchronous pulse trains will be in phase at times. One such time is shown in the third data pulse interval in which data pulse 60*a* and low amplitude excitation pulse 28*a* are coincident. Means are provided to isolate the two pulse sources so that the resultant amplitude of the drive pulses to transducers 16 or 48 would not be greater than desired. The drive pulses actually applied to the transducers are shown in FIG. 5, waveform c. Note that these drive pulses include both the data pulses 60 and the low amplitude excitation pulses 28, but, due to the isolation between pulse sources, no greater amplitude is produced where a pulse from each source is coincidentally present.

The data pulses are gated to the associated driver 35 to energize (through output terminal 41) the transducer 16 in a single nozzle system or to the designated transducer 48 when using a multi-nozzle array. The low amplitude excitation pulses from source 33 are directed to Darlington driver 36 which is coupled to drive each of the transducers 16 or 48. For larger numbers of transducers more than one Darlington driver 36 may be required with each driver coupled to drive a number of transducers. A series of diodes 39 are provided to isolate the two pulse sources. Note that if a data pulse 60 is present to energize a particular transducer, the diode 39 is effective to block any low amplitude excitation pulses 28 from driver 36 from being coupled through output terminals 41 to transducers 16 or 48. This effectively prevents energization of the transducers 16 or 48 concurrently with both a data pulse 60 and a low amplitude excitation pulse 28.

In the embodiment shown in FIG. 5, the pulses generated by source 33′ are synchronous with respect to the drop interval T. In this case the pulses can be timed from the same pulse source 32 that is used to define the drop interval time T. The pulses can be timed by utilizing pulses from clock pulse generator 32 with a fixed delay D so that the low amplitude excitation pulses are produced intermediate the intervals T as shown in FIG. 7. The pulses from source 33 are coupled to driver 36 as in the FIG. 4 embodiment to drive all the transducers 16 or 48.

In a specific embodiment similar to the array shown in FIGS. 2 and 3, data pulses 60 were of 15 volts amplitude and 20 microseconds pulse width. The low amplitude excitation pulses 28 were 3 volts in amplitude and 10 microseconds pulse width. High resolution printing similar to that shown in FIG. 9 resulted, and the apparatus was operable with inks up to a viscosity of 100 centipoise.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A drop-on-demand ink jet printing apparatus comprising a print head having an electromechanical transducer operable, when actuated, to eject a drop of ink, means for generating drop ejecting voltage drive pulses of at least a predetermined amplitude, said voltage drive pulses being selectively produced at a predetermined regularly recurring drop production rate, and means for coupling said drop ejecting voltage drive pulses to said transducer to actuate said transducer to produce one ink drop in response to each of said drop ejecting voltage drive pulses, the improvement comprising:

means to produce a series of voltage excitation pulses, said voltage excitation pulses having a predetermined repetition rate and an amplitude small with respect to said predetermined amplitude;

means for relatively timing said voltage excitation pulses with respect to said drop ejecting voltage drive pulses at said predetermined drop production rate so that said voltage excitation pulses drive said transducer during the intervals between said drop ejecting voltage drive pulses; and means for coupling said voltage excitation pulses to continuously actuate said transducer so that a pressure wave is propagated in the ink in response to said voltage excitation pulses to maintain dynamic ink characteristics constant and thereby prevent misplaced or missing ink drops after an idle period.

2. The apparatus of claim 1 wherein said predetermined repetition rate of said voltage excitation pulses is with respect to said predetermined synchronous drop production rate.

3. The apparatus of claim 1 wherein said predetermined repetition rate of said voltage excitation pulses is with respect to said predetermined synchronous drop production rate.

4. The apparatus of claim 1 wherein said ink characteristics include a dynamic viscosity within the range of about 6 to 100 centipoise.

5. The apparatus of claim 1 wherein said print head comprises a plurality of electromechanical transducers and means to couple said voltage excitation pulses to each of said transducers.

6. The apparatus of claim 5 wherein said predetermined repetition rate of said voltage excitation pulses is with respect to said predetermined synchronous drop production rate.

7. The apparatus of claim 5 wherein said predetermined repetition rate of said voltage excitation pulses is with respect to said predetermined synchronous drop production rate for each of said transducers and additionally comprising means for delaying said voltage excitation pulses with respect to said predetermined drop production rate for each of said transducers so that said voltage excitation pulses drive said transducer during the intervals between said drop ejecting voltage drive pulses.

8. The apparatus of claim 5 wherein said ink characteristics include a dynamic viscosity within the range of about 6 to 100 centipoise.

9. A method of operating a drop-on-demand ink jet printing apparatus comprising a print head having an electromechanical transducer operable, when actuated, to eject a drop of ink, means for generating drop ejecting voltage drive pulses of at least a predetermined synchronous drop production rate, and means for coupling said drop ejecting voltage drive pulses to said transducer to actuate said transducer to produce one ink drop in response to each of said drop ejecting voltage drive pulses, said method comprising the steps of:

establishing periodic pressure waves in the ink cavity of a magnitude insufficient to cause ejection of a drop of ink but sufficient to maintain steady dynamic characteristics in the ink, said pressure waves being established during the intervals between drop ejecting drive pulses.

* * * * *

UNITED STATES PATENT AND TRADEMARK OFFICE
CERTIFICATE OF CORRECTION

PATENT NO. : 4,492,968

DATED : January 8, 1985

INVENTOR(S) : Francis C. Lee, Ross N. Mills, Tiefa K. Niweigha, Frank E. Talke

It is certified that error appears in the above-identified patent and that said Letters Patent are herebv corrected as shown below:

Column 6, line 35, before the word "with" insert --asynchronous--' before the word "drop" cancel "synchronous".

Column 6, line 50, before the word "with" insert --asynchronous--; before the word "drop" cancel "synchronous".

Signed and Sealed this

*Twentieth* Day of *August 1985*

[SEAL]

*Attest:*

DONALD J. QUIGG

*Attesting Officer* *Acting Commissioner of Patents and Trademarks*

UNITED STATES PATENT AND TRADEMARK OFFICE
CERTIFICATE OF CORRECTION

PATENT NO. : 4,492,968

DATED : January 8, 1985

INVENTOR(S) : Francis C. Lee, Ross N. Mills, Tiefa K. Niweigha, Frank E. Talke

It is certified that error appears in the above-identified patent and that said Letters Patent is hereby corrected as shown below:

Column 6, line 39, before the word "with" insert --synchronous--; before the word "drop" cancel "synchronous".

Column 6, line 54, before the word "with" insert --synchronous--; before the word "drop" cancel "synchronous".

Signed and Sealed this

*Third* Day of *December 1985*

[SEAL]

*Attest:*

DONALD J. QUIGG

*Attesting Officer* — *Commissioner of Patents and Trademarks*